US011608905B2

(12) United States Patent
O'Brien et al.

(10) Patent No.: US 11,608,905 B2
(45) Date of Patent: Mar. 21, 2023

(54) MODULAR VALVE SYSTEM

(71) Applicant: TSI Products, Inc., Arlington, TX (US)

(72) Inventors: Stephen William O'Brien, Irving, TX (US); Todd Michael Coleman, The Colony, TX (US)

(73) Assignee: TSI Products, Inc., Arlington, TX (US)

( * ) Notice: Subject to any disclaimer, the term of this patent is extended or adjusted under 35 U.S.C. 154(b) by 224 days.

(21) Appl. No.: 17/081,507

(22) Filed: Oct. 27, 2020

(65) Prior Publication Data

US 2021/0131578 A1 May 6, 2021

Related U.S. Application Data

(60) Provisional application No. 62/929,281, filed on Nov. 1, 2019.

(51) Int. Cl.
*F16K 27/06* (2006.01)
*F24F 11/84* (2018.01)
*F16K 11/087* (2006.01)

(52) U.S. Cl.
CPC ........ *F16K 27/067* (2013.01); *F16K 11/0873* (2013.01); *F24F 11/84* (2018.01)

(58) Field of Classification Search
CPC .... F16K 11/0873; F16K 27/067; F16L 21/06; F16L 33/02; F16L 33/03; F16L 33/035; F24F 11/84
See application file for complete search history.

(56) References Cited

U.S. PATENT DOCUMENTS

| 4,005,883 | A | | 2/1977 | Guest et al. |
| 4,423,892 | A | * | 1/1984 | Bartholomew ..... F16L 37/0987 285/305 |
| 4,479,513 | A | * | 10/1984 | Koch ................... F16K 27/067 251/286 |
| 4,938,510 | A | | 7/1990 | Gmeiner et al. |
| 4,979,530 | A | | 12/1990 | Breda |
| 5,282,724 | A | | 2/1994 | Reynolds |
| 5,507,630 | A | | 4/1996 | Hegebarth |
| 5,895,078 | A | | 4/1999 | Le Clinche |
| 5,988,220 | A | | 11/1999 | Sakaki |
| 6,019,348 | A | | 2/2000 | Powell |
| 6,634,679 | B1 | | 10/2003 | Stieler |

(Continued)

FOREIGN PATENT DOCUMENTS

CA 2309447 C 5/1999

OTHER PUBLICATIONS

JG John Guest Products, Locking Clip, website for product, screenshot captured Oct. 25, 2019, https://www.johnguest.com/product/accessories-fittings-pneumatics/locking-clip/.

(Continued)

*Primary Examiner* — Michael R Reid
(74) *Attorney, Agent, or Firm* — Hitchcock Evert, LLP

(57) ABSTRACT

A modular valve system having fixed valve ports with frame openings on the exterior of each port. Corresponding connectors or plugs are designed to fit within the valve ports and be locked in place by a clip passing through the framed openings and around the connector or plug. The internal valve component may be electrically or mechanically controlled. The modular valve system may be connected to a vehicle coolant system to control fluid flow to a heat exchanger or bypassing the heat exchanger.

7 Claims, 19 Drawing Sheets

(56) References Cited

U.S. PATENT DOCUMENTS

| | | | |
|---|---|---|---|
| 6,863,314 B2 | 3/2005 | Guest | |
| 9,964,329 B2 * | 5/2018 | Whitmore | ........... F24D 19/1024 |
| 2004/0051313 A1 | 3/2004 | Trouyet | |
| 2013/0307263 A1 | 11/2013 | Parks et al. | |

OTHER PUBLICATIONS

ProAir Water Valve Elecectric 3-Port, website for product, screenshot captured Oct. 25, 2019, https://www.proairllc.com/water-valve-elecetric-3-port/.

ProAir Water Valve Elecectric 2-Port, website for product, screenshot captured Oct. 25, 2019, https://www.proairllc.com/water-valveelecectric-2-port/.

Super Speedfit Locking Clip, website for product, screenshot captured Apr. 14, 2020, https://www.usplastic.com/catalog/item.aspx?itemid=23508.

Autobahn Parts, Tesla Model S (2012-2016) OEM Coolant 3-Way Valve Actuator, website for product, screenshot captured Apr. 14, 2020, www.autobahnparts.eom/part/tesla-model-s-2012-2016-oem-coolant-3-way-valve-actuator-6007384-00-b.

* cited by examiner

MODULAR VALVE SYSTEM

CROSS-REFERENCE TO RELATED APPLICATION

This application claims the benefit of priority from U.S. Provisional Application No. 62/929,281 filed on Nov. 1, 2019, which is incorporated herein by reference.

FIELD OF THE DISCLOSURE

The invention relates generally to valve systems.

BACKGROUND

Valves are used in many systems to control and direct the flow of gas or liquids through the system. For example, household water faucets include a valve to control whether water is flowing and how much. Different valves are designed for specific jobs and implementations. Valve size is often configured to manage a desired flow rate and withstand any pressure within the system.

A vehicle heating and cooling system circulates fluids through multiple components—such as a compressor, a condenser, an evaporator and heater cores—to condition the air. This system uses high and low pressure flows to control air conditioning. In addition to managing cabin temperature, some vehicles use the heating and cooling system to heat or cool components within the vehicle. For example, vehicles may include features to cool electronics. Other vehicles use the cooling system to warm an engine on cold days.

Vehicle heating and cooling system valves are typically mounted to a frame that holds the valve in place and supports the valve control components—e.g., an electronic servo. These valves include valve ports extending from the internal valve component. For example, a three-way ball valve may include three valve ports extending from a central body that houses the ball valve. The open path between the valve ports depends on the orientation of the ball. The ball valve may be designed to permit only a single pathway between two ports at a time, open all three ports or shut off the fluid flow entirely.

Valve ports are typically fixed to a valve chamber and provide a rigid structure for connecting a tube to the valve. For example, a tube may be fitted over the valve port and held in place using an external clamp.

Installation thus requires mounting the frame, holding the valve, connecting the tube to the valve port and securing, but without over- or under-tightening, the tube to the valve port. This process has become increasingly difficult as the space within vehicles has compressed. This is an even greater challenge in smaller vehicles—such as small automobiles, all-terrain vehicles (ATVs), boats, tractors, farm equipment, golf carts, utility vehicles, side-by-side vehicles, etc.

Valves are made in multiple shapes and sizes, with a variety of port designs, to accommodate each environment's available space and connection sizes. Not only will different types of environments dictate size and shape, often the options can be brand specific. For example, the space in a Honda vehicle may be vastly different than a Toyota. This requires valve manufacturers and suppliers to keep a variety of valves in their inventory for each potential use.

SUMMARY

The present disclosure provides a modular valve system having a compact body and inset ports around the valve. The system further includes a series of modular connectors configured to engage the ports. The connectors facilitate multiple configurations for the valve system. The modular valve system may be installed in limited space environments using preferred connector configurations to best fit the space.

In some embodiments, the modular valve system is a three-way valve. The ports may form a "T" shape through the valve with two ports axially aligned and the third port perpendicularly aligned. In some embodiments, the valve is attached to an electronic servo for controlling the operation. In some embodiments, the servo may be connected physically or wirelessly with a sensor and adjust operation of the system based on sensor signals.

The housing of the valve body may have ports directed internally to the valve component. In addition, the housing of the valve body may include a framed section around the exterior of each port through which the connector will engage the inset port. The port may include an internal portion adjacent to the valve chamber and a rim that is set back and adjacent to the frame.

The connectors include a first end designed to engage the valve port and create a fluid-tight seal. A channel holding an O-ring or other seal or gasket may be near the first end and located between the end edge and a raised flange. When the connector engages the port, the first end may abut an internal portion of the port and the raised flange may abut the rim. A second channel may be located behind the raised flange prior to the connector's extended portion.

In some embodiments, an opening in the frame and the second channel in the connector align. A locking clip may be inserted through the frame and may wrap around the connector to hold the connector in the engaged position. In some embodiments, the locking clip may include one or more barbs designed to catch the frame's strut to keep the locking clip in place.

The connectors may include a variety of designs and shapes, such as extended tube ports that are straight, angled or curved. Connectors may also include rigid or flexible tubes to connect directly to another component in the system. For example, the connector may attach directly between the intersection of the valve and a heat exchanger in a vehicle HVAC system. In some embodiments, one or more connectors may also support the valve without the need to attach the valve to a support frame. The modular valve system may also include plugs designed to engage a select valve port to allow the three-way valve to operate as a two-way valve that may allow or shut off fluid flow.

In some embodiments, the connectors may be attached to tubes or hoses prior to installation. The attachment may occur at the manufacturer, at a distributor or vendor, or at the installation location. If the connector is pre-attached to a tube, the tube may be connected directly to the valve during installation by engaging the connector with the valve port. In some embodiments, connectors may be attached to both sides of a hose at the manufacturer in order to be used between components that each have framed engagement ports like the valve.

In some embodiments, the modular valve system may be connected to a vehicle heating and cooling system between an engine block output and a heater core or heat exchanger. Fluid exiting from the heat exchanger or the valve's third stem may be directed through a return loop, passing by the engine crankcase before entering a radiator, which reduces the temperature of the fluid. The cooled fluid may then return to the engine block to continue the loop. During operation, a manual control or a system sensor may direct the servo to change the orientation of the valve between the heater core path and the return loop path.

A BRIEF DESCRIPTION OF THE DRAWINGS

Embodiments will now be described, by way of example only, with references to the accompanying drawings in which.

DETAILED DESCRIPTION

While this invention may be embodied in many different forms, there will herein be described in detail preferred embodiments of the invention with the understanding that the present disclosure is to be considered as an exemplification of the principles of the invention and is not intended to limit the broad aspects of the invention to the embodiments illustrated. It will be understood that the invention may be embodied in other specific forms without departing from the spirit or central characteristics thereof. The present embodiments, therefore, are to be considered in all respects as illustrative and not restrictive, and the invention is not to be limited to the details given herein. As used herein, air conditioning may refer to conditioning of the air by heating, cooling, modifying speed of the airflow and/or other conditioning. In addition, fluid flow refers to all matter that moves like a fluid, including gases and liquids, unless specified.

FIGS. 1A-F show various views of valve 100 having three ports aligned in a sideways "T" shape. Top port 102 is shown aligned directly above bottom port 106, and side port 104 is directed perpendicularly to the right side of valve 100. The directional terms (top, bottom, right, etc.) are used for reference with respect to the figures and do not limit the orientation or installation of the valve 100 or other elements described. While the embodiment shown depicts a three port design, other embodiments include multi-port valves with two or more ports. In addition, other embodiments may use alternative configurations to the "T" shape illustrated.

Figure 1A:
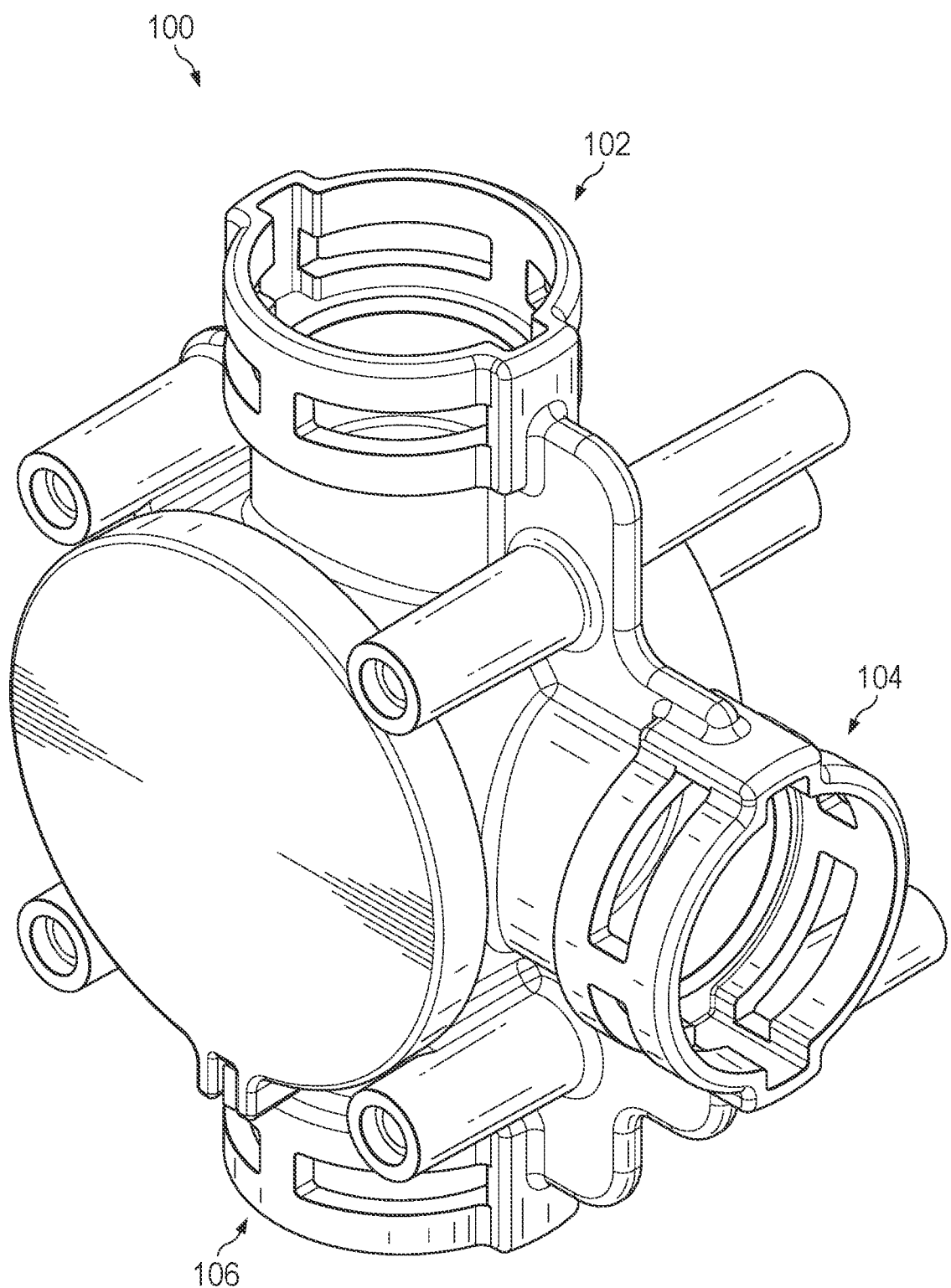
FIG. 1A is a perspective view of an embodiment of a three-way valve.
Figure 1B:
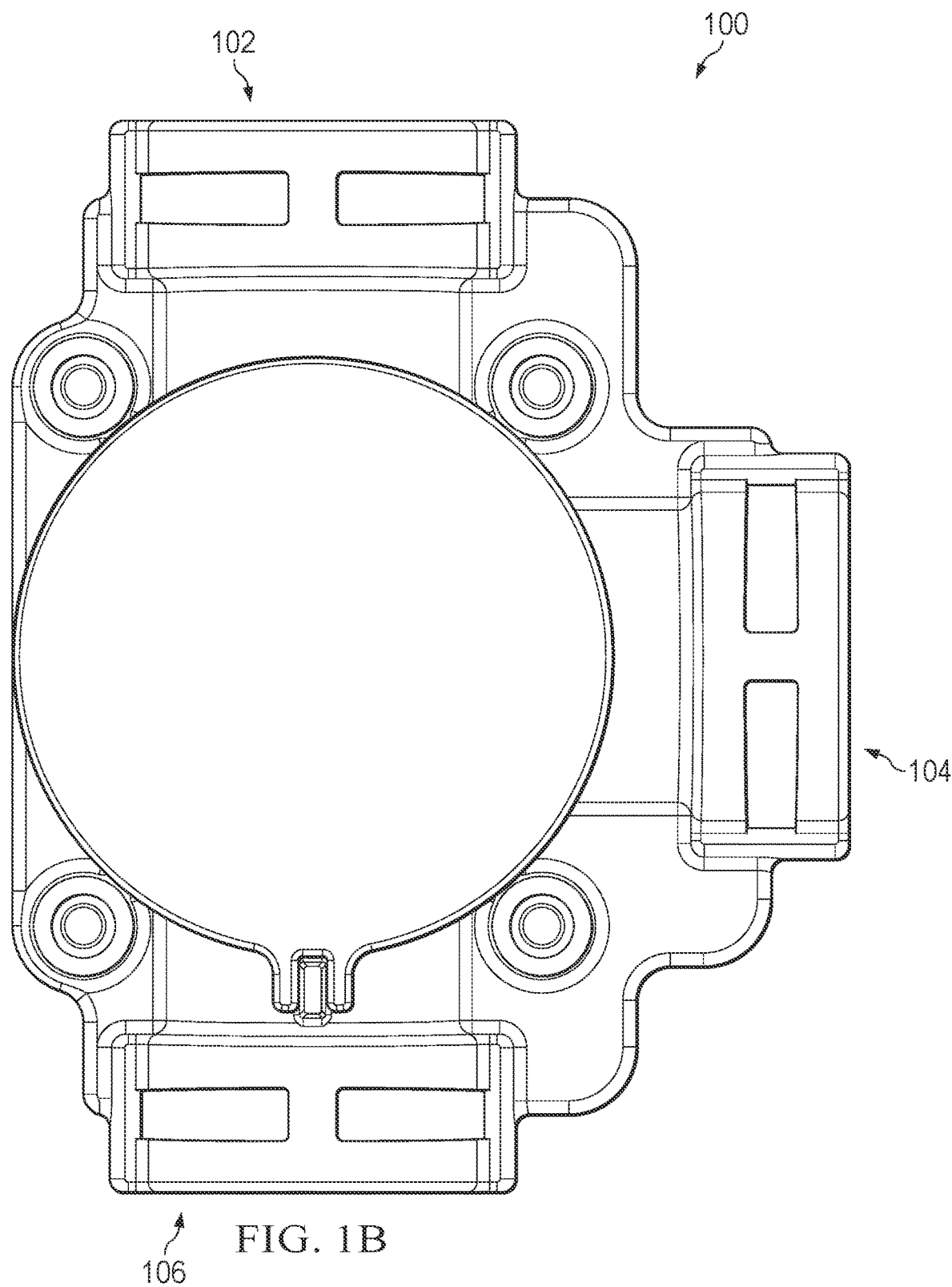
FIG. 1B is a front view of an embodiment of a three-way valve.
Figure 1C:
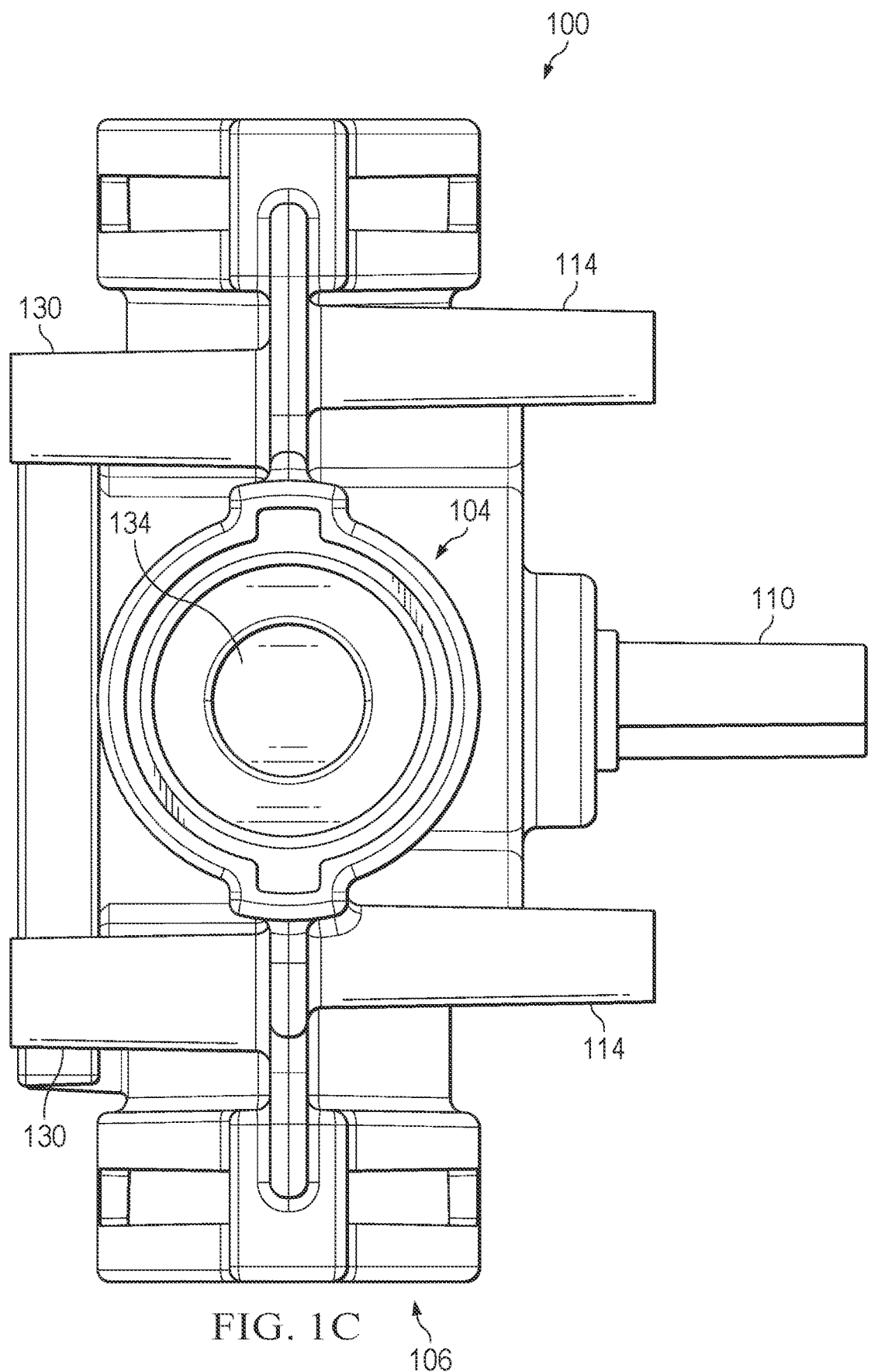
FIG. 1C is a right side view of an embodiment of a three-way valve.
Figure 1D:
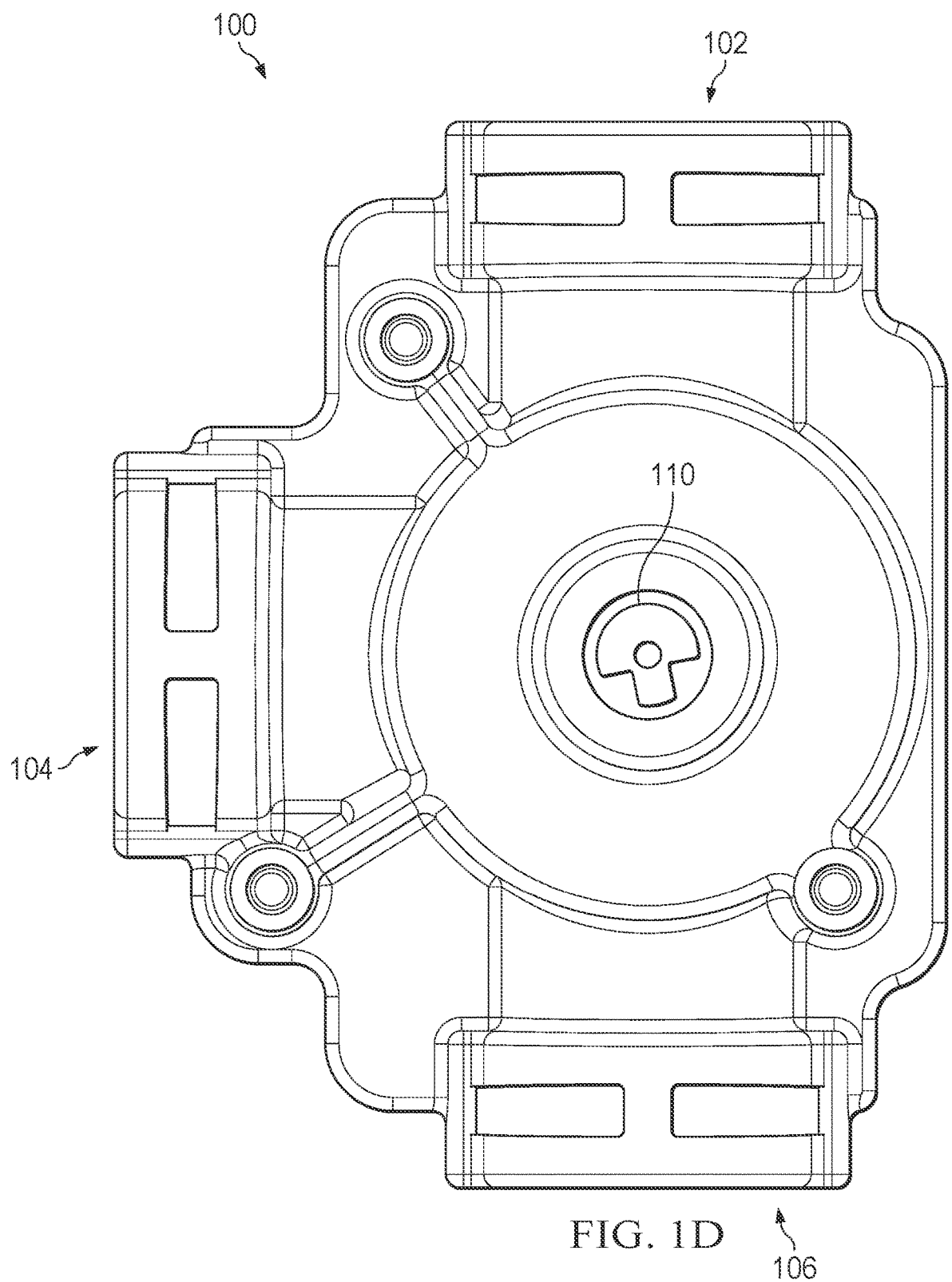
FIG. 1D is a back view of an embodiment of a three-way valve.
Figure 1E:
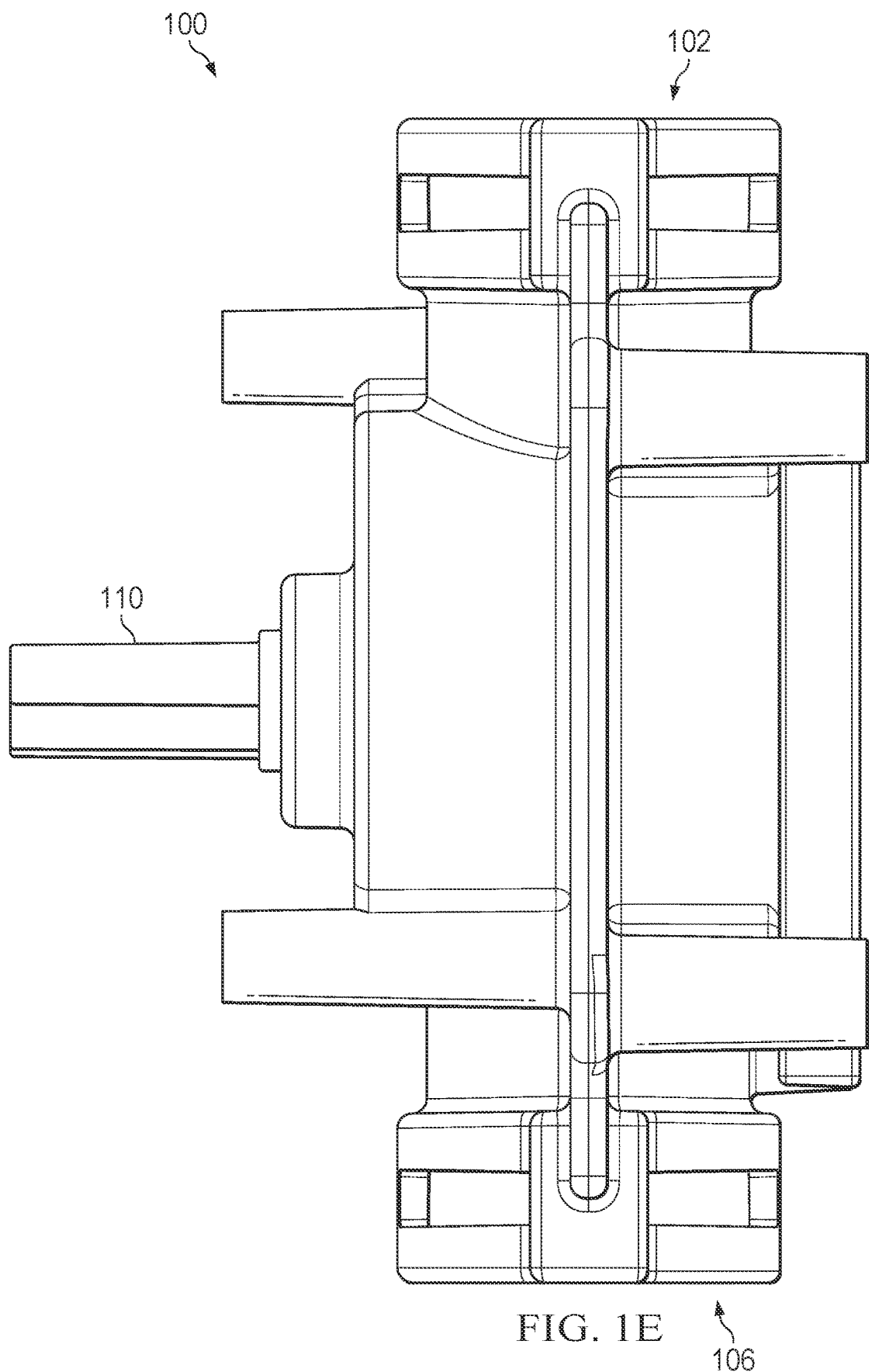
FIG. 1E is a left side view of an embodiment of a three-way valve.
Figure 1F:
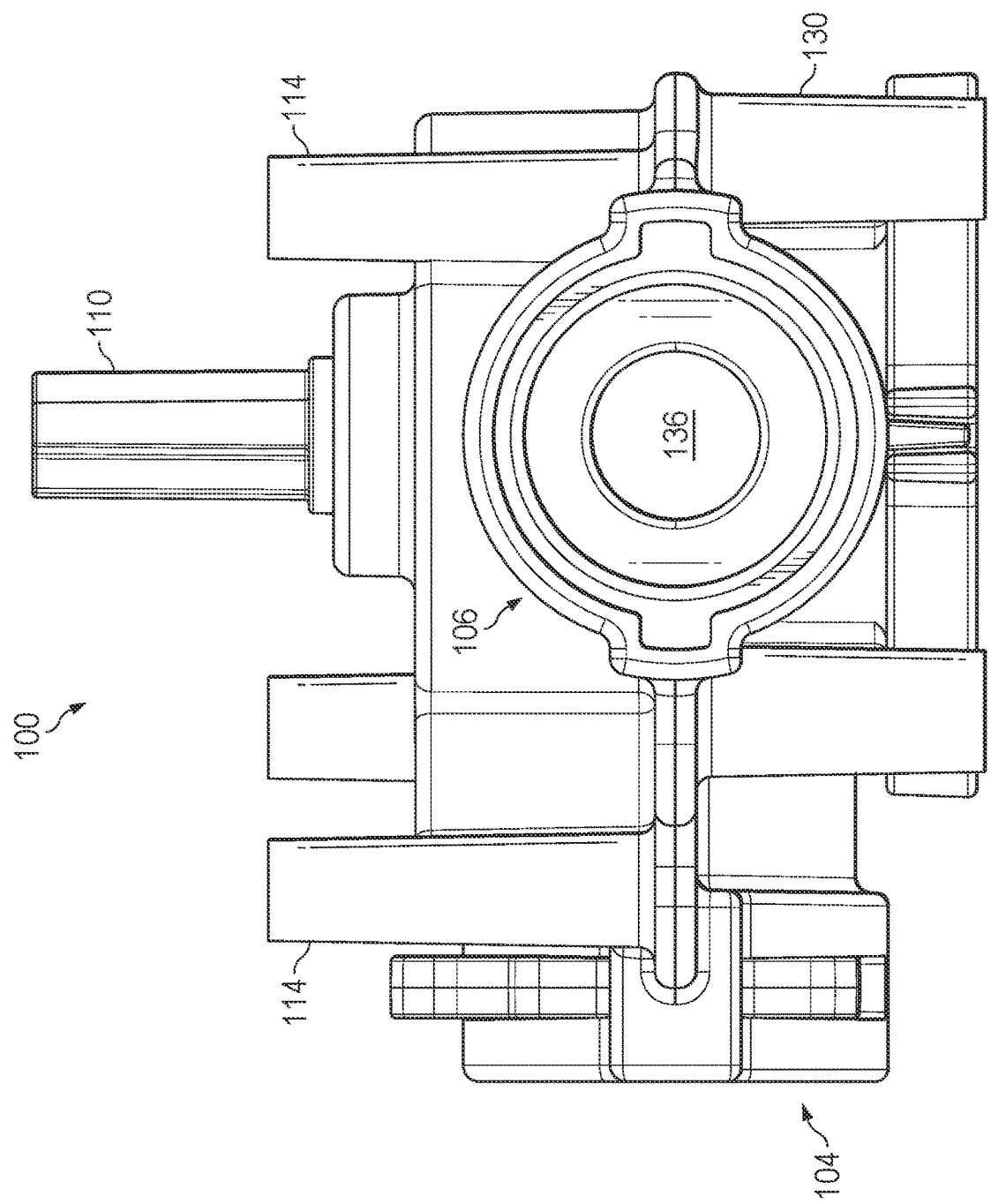
FIG. 1F is a bottom view of an embodiment of a three-way valve.
Figure 1G:
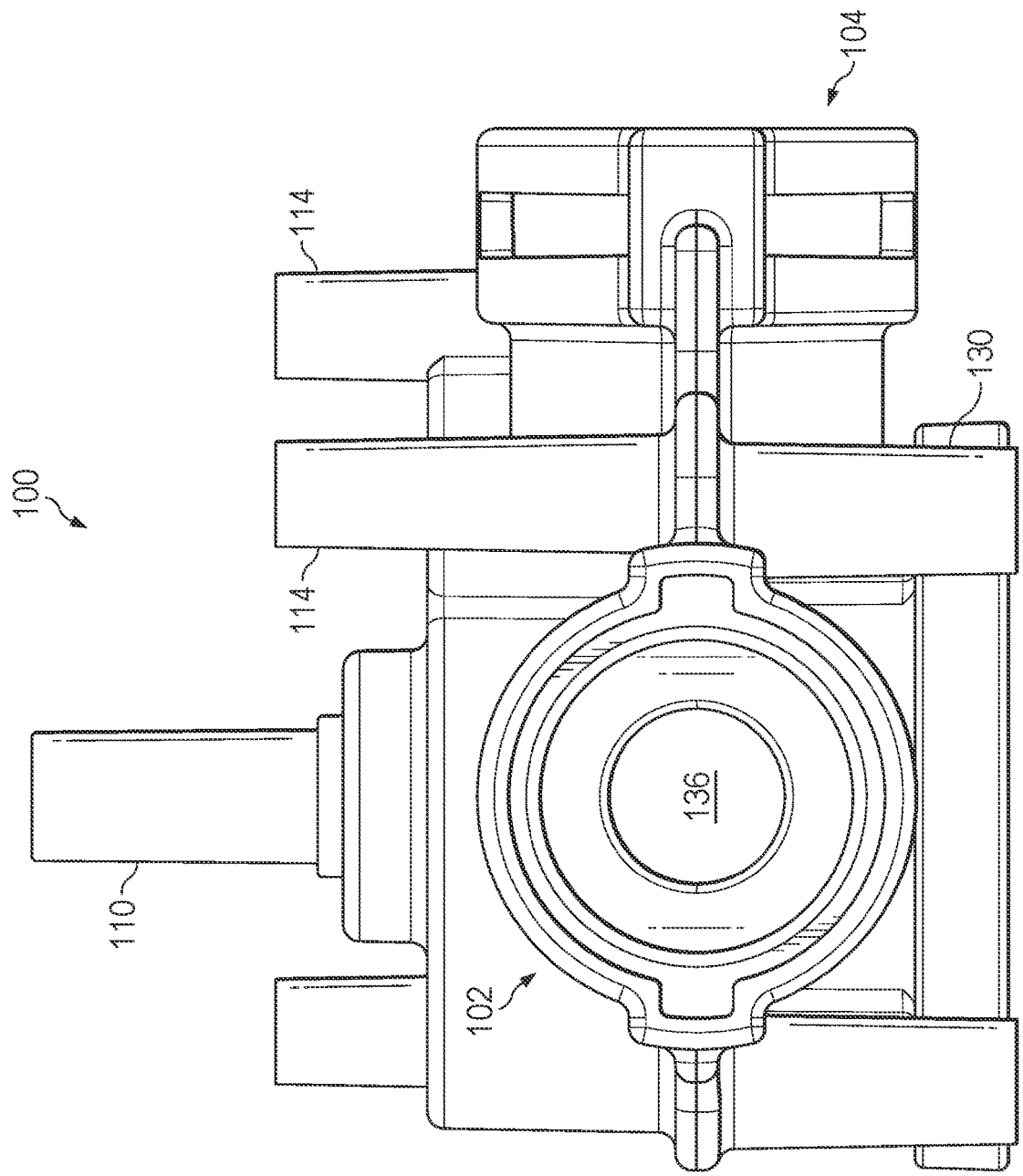
FIG. 1G is a top view of an embodiment of a three-way valve.

The valve 100 includes control stem 110 connected to an internal valve member 134, which is visible in FIG. 1C within port 104. The valve member 134 in this embodiment is designed to rotate around the axis defined by the placement of the valve member 134 through the control stem 110. The valve member 134 may have internal pathways making a "T" shape. As the valve member 134 rotates, the pathways change to open and connect different ports. For example, FIG. 1C shows valve 100 with a valve member 134 in a position causing a closed, side port 104, an open, top port 102 and an open, bottom port 106 creating pathway 136. If valve member 134 is turned 90 degrees clockwise (based on the orientation in FIG. 1B), top port 102 will become shut and side port 104 will be connected to bottom port 106 through a new pathway. In some embodiments, the valve 100 may be designed to only allow a limited number of configurations. In other embodiments, the valve member 134 may be freely rotatable to allow all options. In some embodiments, the valve member 134 may be a ball valve.

The control stem 110 is attached to the valve member 134 and operable to turn the valve member 134 within the body of the valve 100. In some embodiments, the control stem 110 may be manually turned using a handle, wire control or an actuator. For example, a lever or plate may be attached to the control stem 110, and a cable may be connected to the lever or plate to facilitate mechanical control of the valve member 134.

In addition, the body of valve 100 includes control posts 114 for connecting a controller, such as a mechanical or electrical device to control the control stem 110. In this embodiment, control posts 114 are hollow and designed to accept a screw, bolt or other engaging component.

On the opposite side of the control posts 114 are a series of mounting posts 130, which are also hollow to accept an engaging component in this embodiment. These mounting posts 130 allow the valve 100 to be connected directly to a structure without the need for an additional frame component. The valve 100 can be installed and mounted to a surface while taking up less space than conventional designs that use a frame component to connect a valve and control mechanism to a surface. In some installations, the mounting posts 130 may not be necessary to use because the compact and lightweight nature of the valve 100 may be supported through a connection between an external component and one of the ports 102, 104 or 106. Some embodiments may not include the mounting posts 130.

In some embodiments, the posts 114 or 130 may be replaced with other connection components. For example, the posts 114 or 130 may have clip connectors that are designed to pass through a corresponding hole in a structure or device and expand to hold the valve 100 to the structure or device. The clips may have one or multiple teeth to allow the clip to connect at different depths.

Figure 2A:
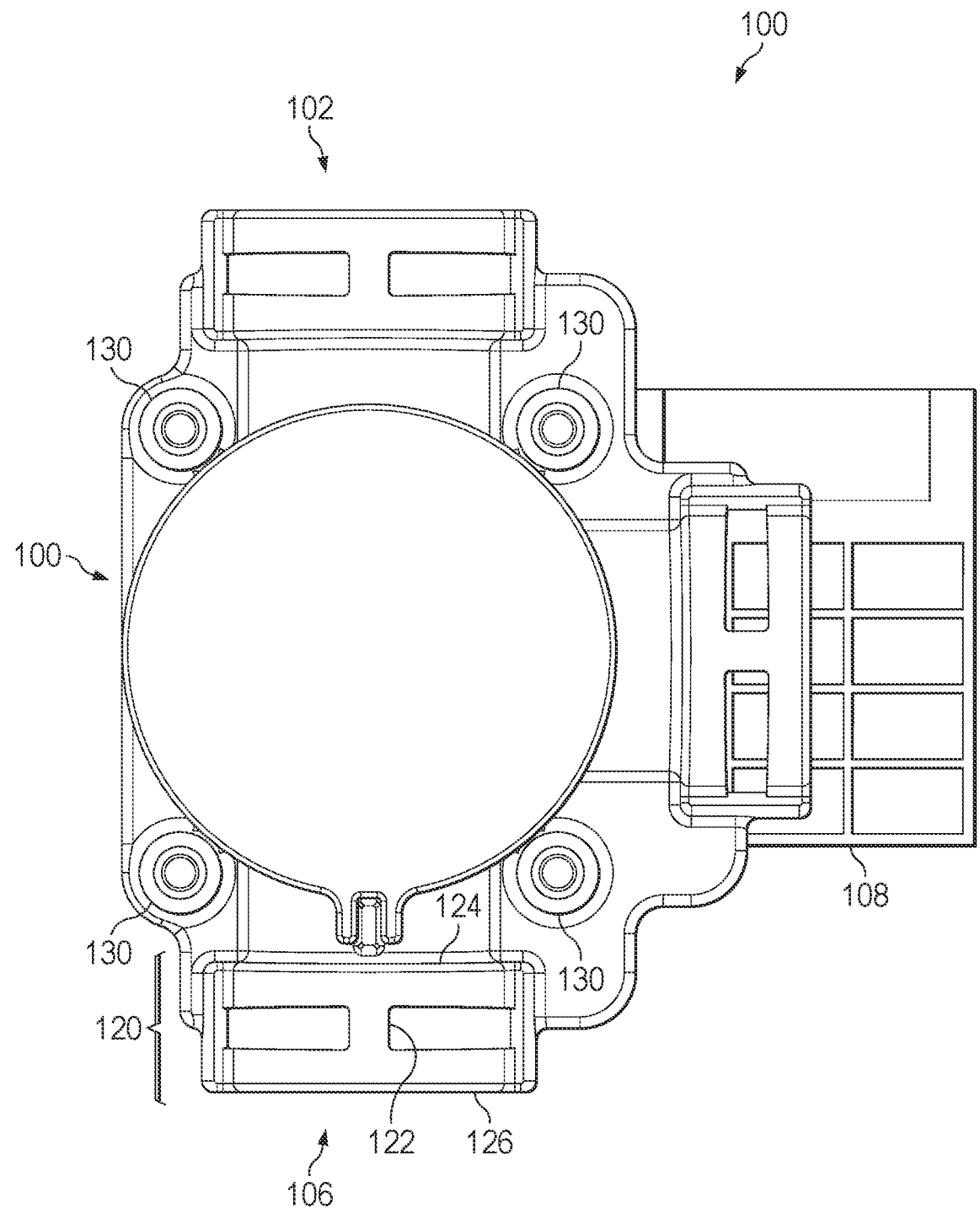
FIG. 2A is a front view of an embodiment of a three-way valve with an attached control component.
Figure 2B:
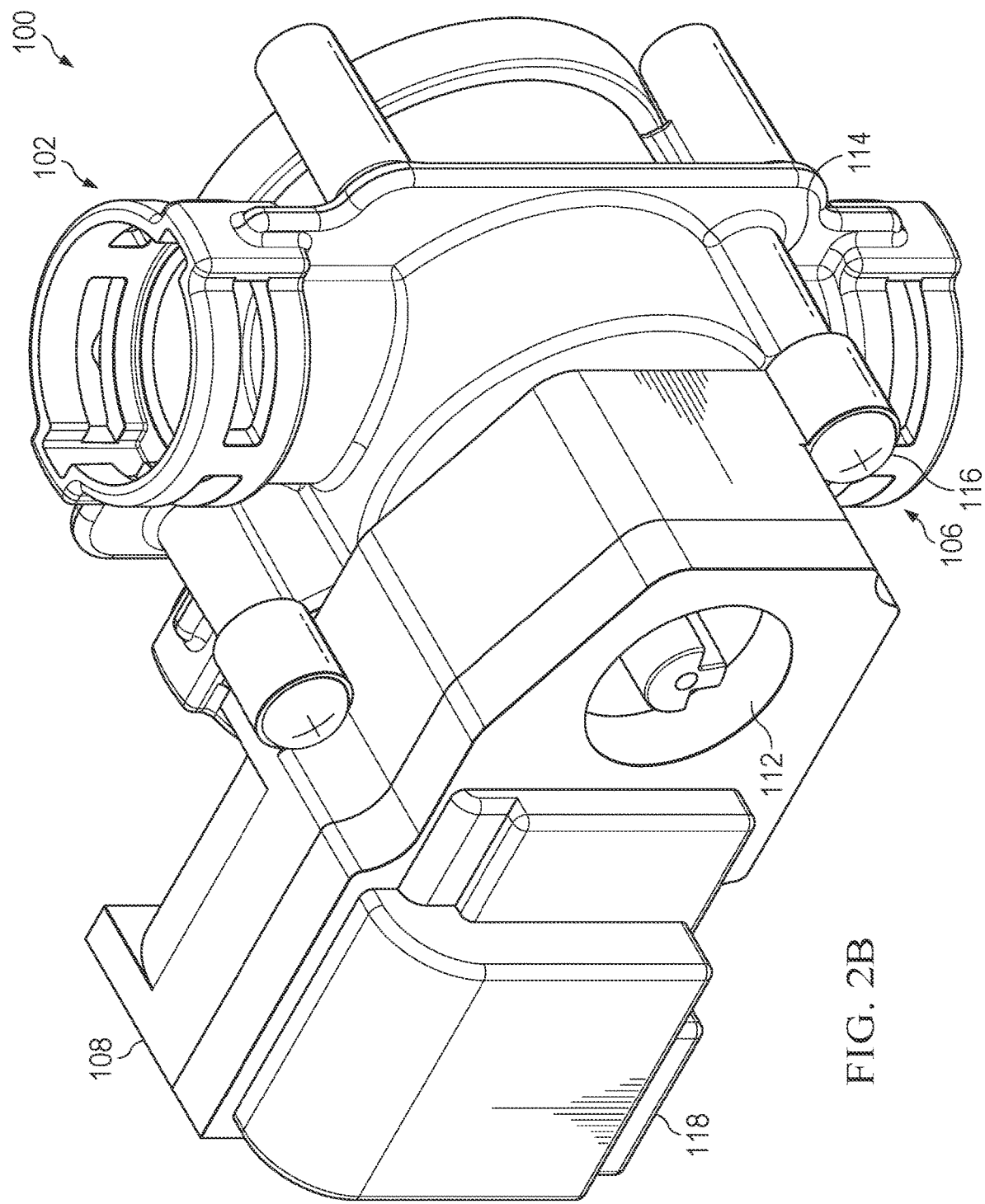
FIG. 2B is a back perspective view of an embodiment of a three-way valve with an attached control component.
Figure 2C:
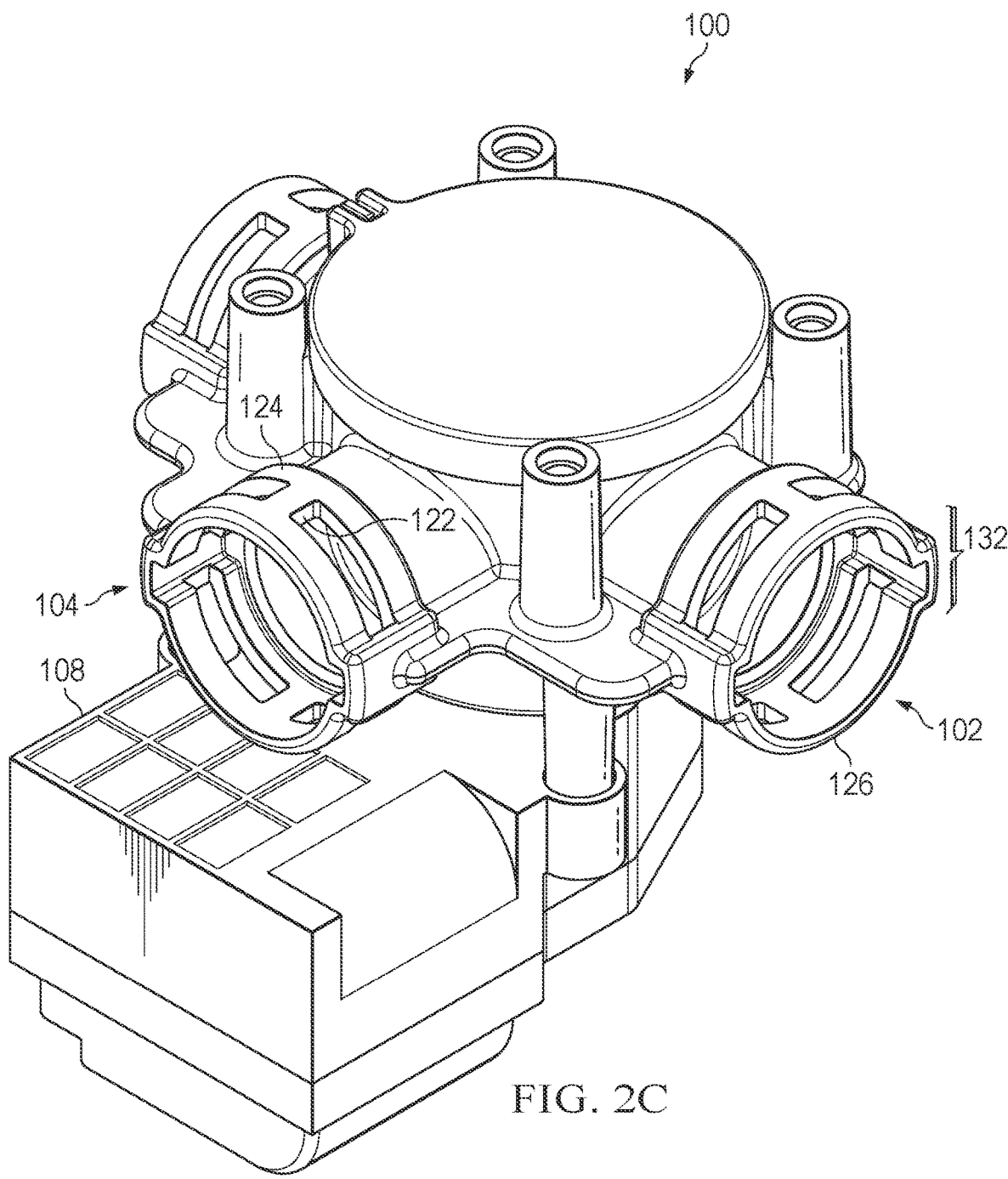
FIG. 2C is a top perspective view of an embodiment of a three-way valve with an attached control component.

FIGS. 2A-C show the valve 100 with the control stem 110 attached to an actuator 108. The actuator 108 may be electrically or mechanically operated. The control stem 110 is engaged with the actuator 108 through a corresponding rotary shaft 112. The control stem 110 and rotary shaft 112 are configured to have corresponding designs akin to gear designs. In the designs shown, the control stem 110 has an extended portion and the rotary shaft 112 has a corresponding channel designed to fit with the extended portion. As the actuator 108 rotates the rotary shaft 112, the engaged control stem 112 is also rotated causing the valve member 134 within the valve body to rotate changing the pathways inside the valve 100.

The housing of actuator 108 is attached to the valve 100 at control posts 114 using a screw 116. In other embodiments, the designs of the connecting components and the connectors used to attach the actuator 108 to the valve 100 may vary. For example, the control posts 114 may be designed to pass through openings in the actuator 108 housing and then be secured to each other with straps across the actuator 108. Alternatively, the devices may be connected by an adhesive, threaded post, tie, clamp, clip, welded connection or other known connections. As another alternative, one or more portions of the body of valve 100 and actuator 108 may be molded together or otherwise integrated.

The ports 102, 104 and 106 each have a frame 120 extending outward. The frame includes a first ring 124 and a second ring 126 spaced apart from the first ring 124 by a pair of struts 122 and channeled struts 132. The first ring 124 is closer to the center of valve 100 than the second ring 126. These components of the frame 120 create frame openings between the first ring 124 and second ring 126.

Figure 3A:
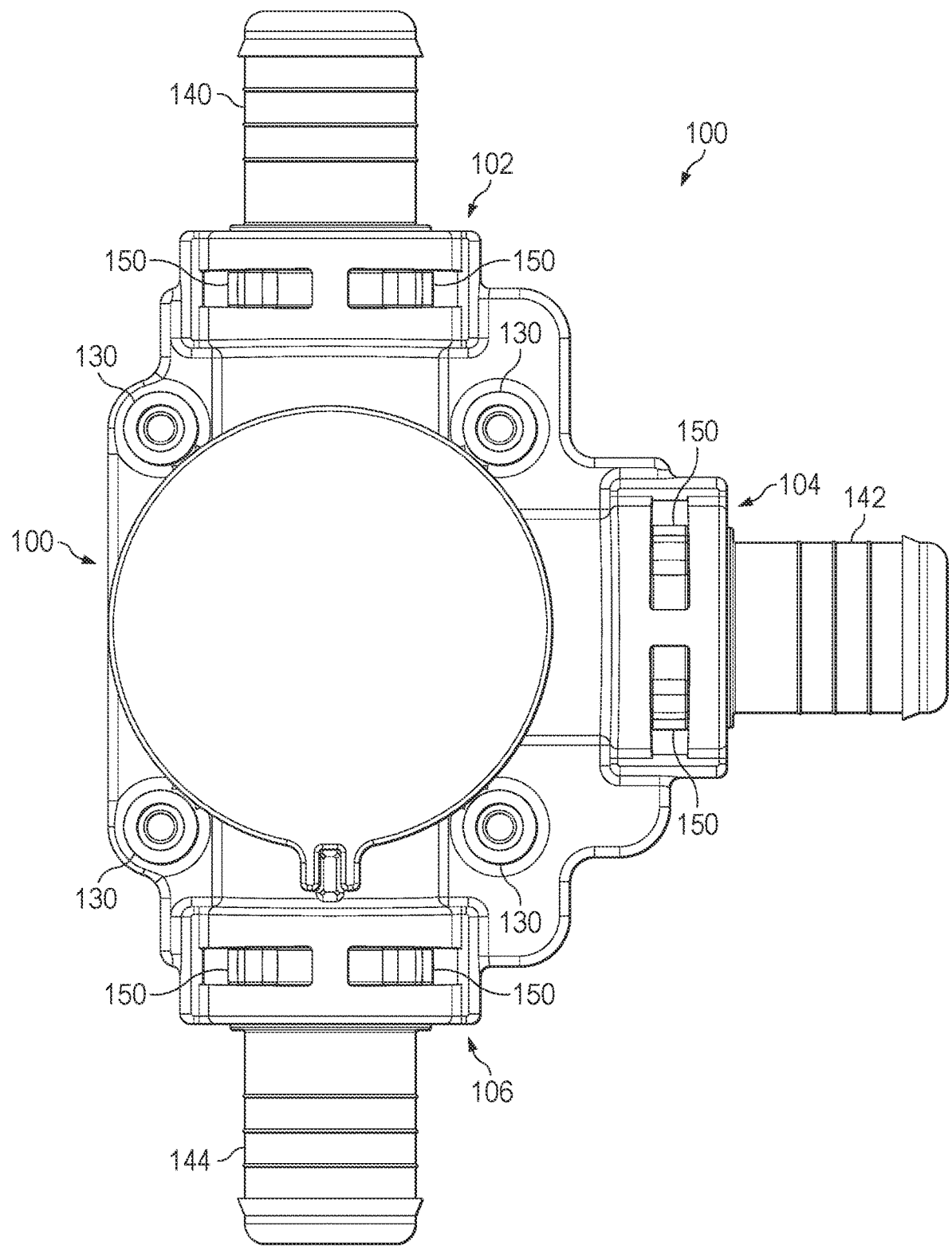
FIG. 3A is a front view of an embodiment of a three-way valve with modular connectors attached.
Figure 3B:
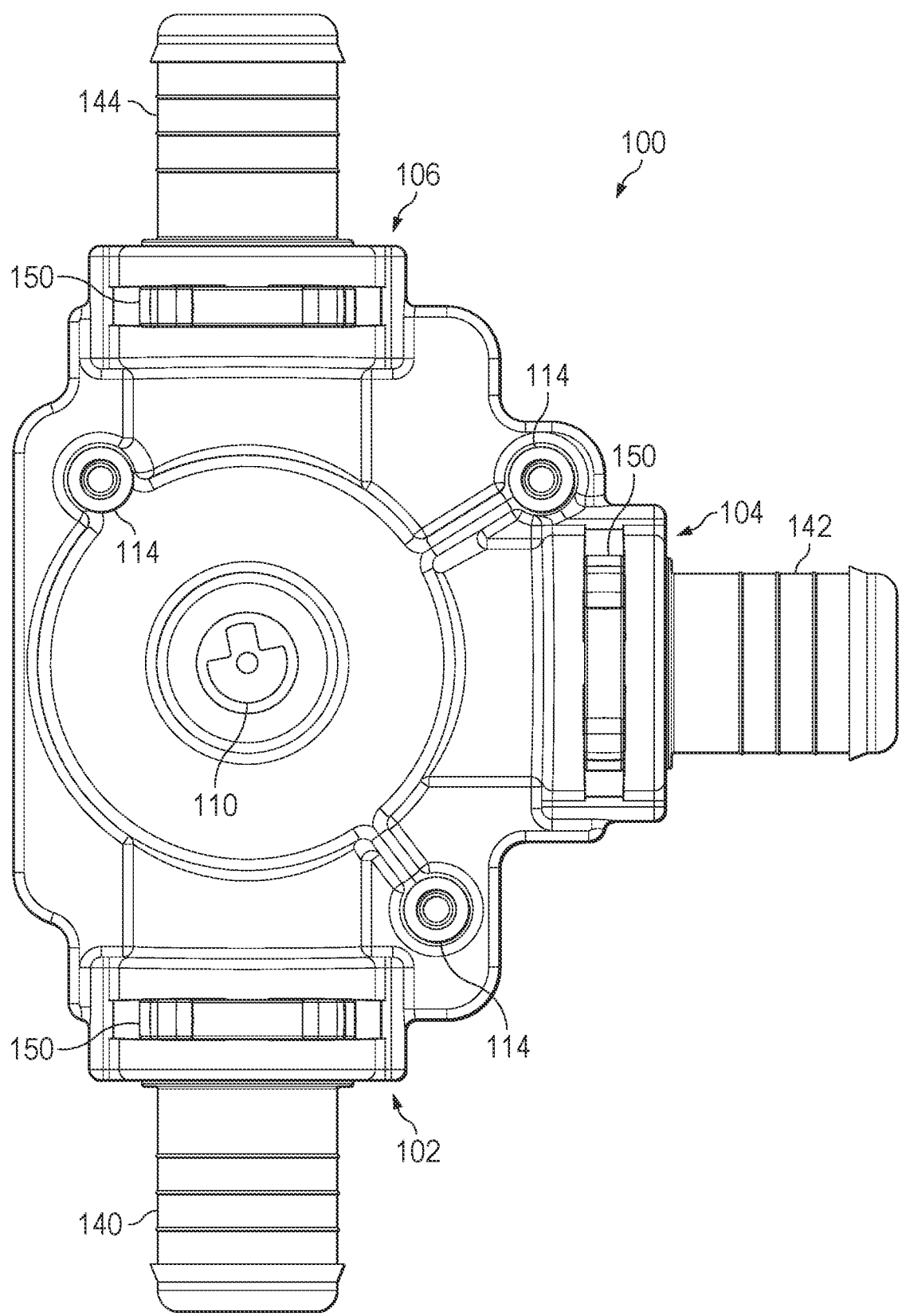
FIG. 3B is a back view of an embodiment of a three-way valve with modular connectors attached.

FIGS. 3A-B show the valve 100 with connectors 140, 142 and 144 in respective ports 102, 104 and 106. In this embodiment, the connectors 140, 142 and 144 are the same design and are attached to the ports 102, 104 and 106 in the same way. Connector 140 is engaged within the top port 102 to create a strong and fluid-tight seal. The connector 140 is locked in place using a locking clip 150, which passes through the openings in the frame 120 around one strut 122. The clip 150 further wraps around a channel in the connector 140 and then extends to each side of the second strut 122. The clip 150's engagement with the frame 120 and the channel of connector 140 help hold the connector 140 in place even when pressure increases occur in the valve 100.

Figure 4:
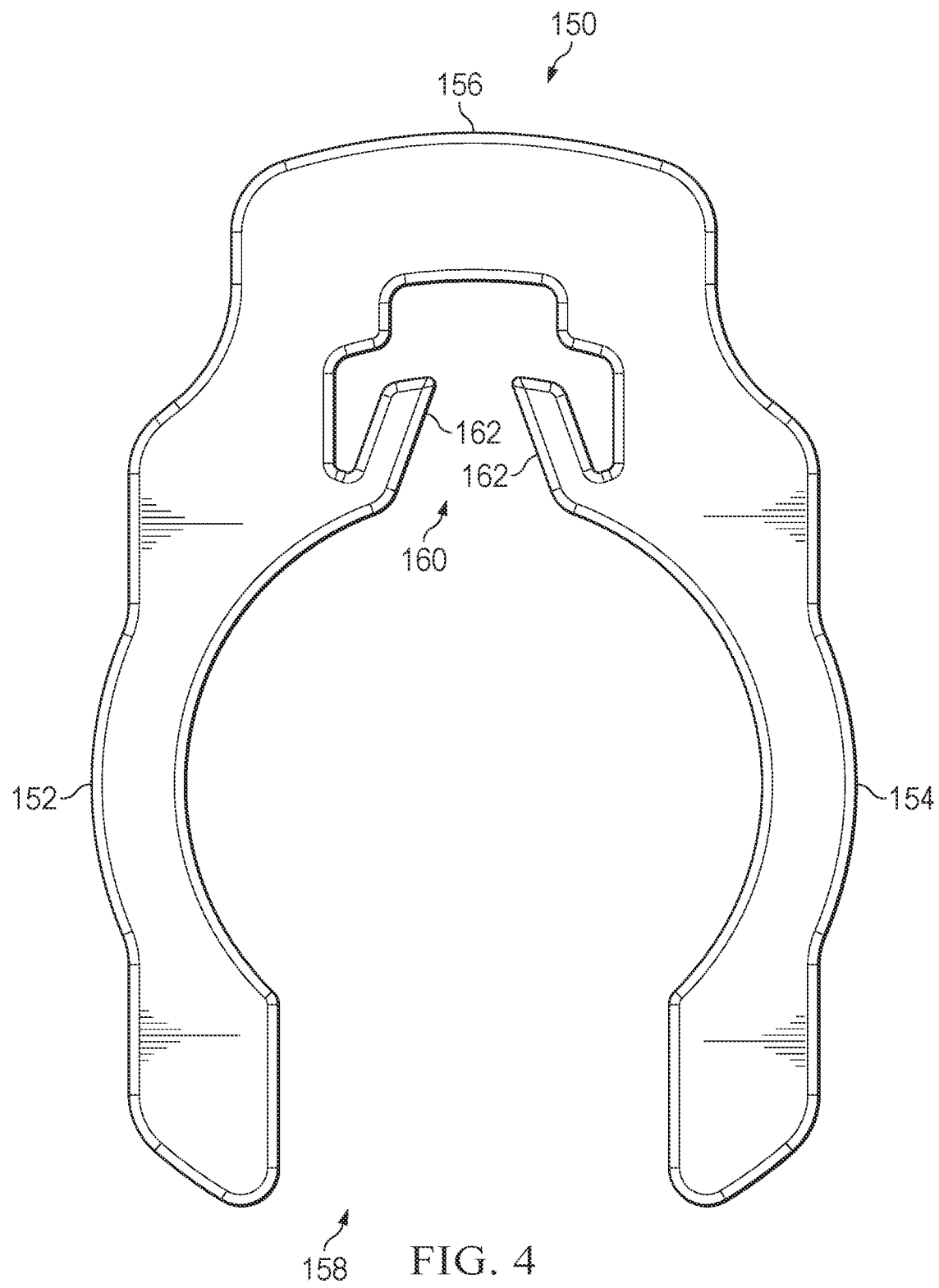
FIG. 4 is a front view of an embodiment of a clip for the modular valve system.

Clip 150 is shown in FIG. 4. The clip 150 includes a first arm 152 connected to a second arm 154 by a bridge 156. The end opposite from the bridge 156 has opening 158. This embodiment includes opening 160 at the base of the bridge 156. Prongs 162 flank each side of the opening 160 and are pointed toward the opening 160 of the bridge 156. When the clip 150 is inserted through the frame 120 to hold the connector 140 in place, the arms 152 and 154 pass on each side of one strut 122 and then flex apart to fit around the connector 140 before pulling back together to grip the connector 140. In addition, the prongs 162 flex apart when passing by the strut 122 and return to the default position once they have passed the strut 122. This creates a locking feature to hold the clip 150 in place in the frame 120 while also locking the connector 140 to the valve 100.

Some embodiments may include alternative designs of clip 150. For example, the bridge 156 may be narrower with the arms 152 and 154 meeting at a more significant angle. In addition, the shoulder sections transitioning from the bridge 156 to each arm 152 and 154 may be reduced to form a smoother transition from the top of the bridge 156 down each arm 152 and 154. Similarly the ends of each arm 152 and 154 opposite from the bridge may be reduced to continue the outer curvature. The materials of clip 150 may also vary while maintaining the strength and flexibility to snap into place and prevent the connector from disengaging from the port. Materials may include plastics, nylons, metals and other similar materials or combinations thereof.

Figure 5A:
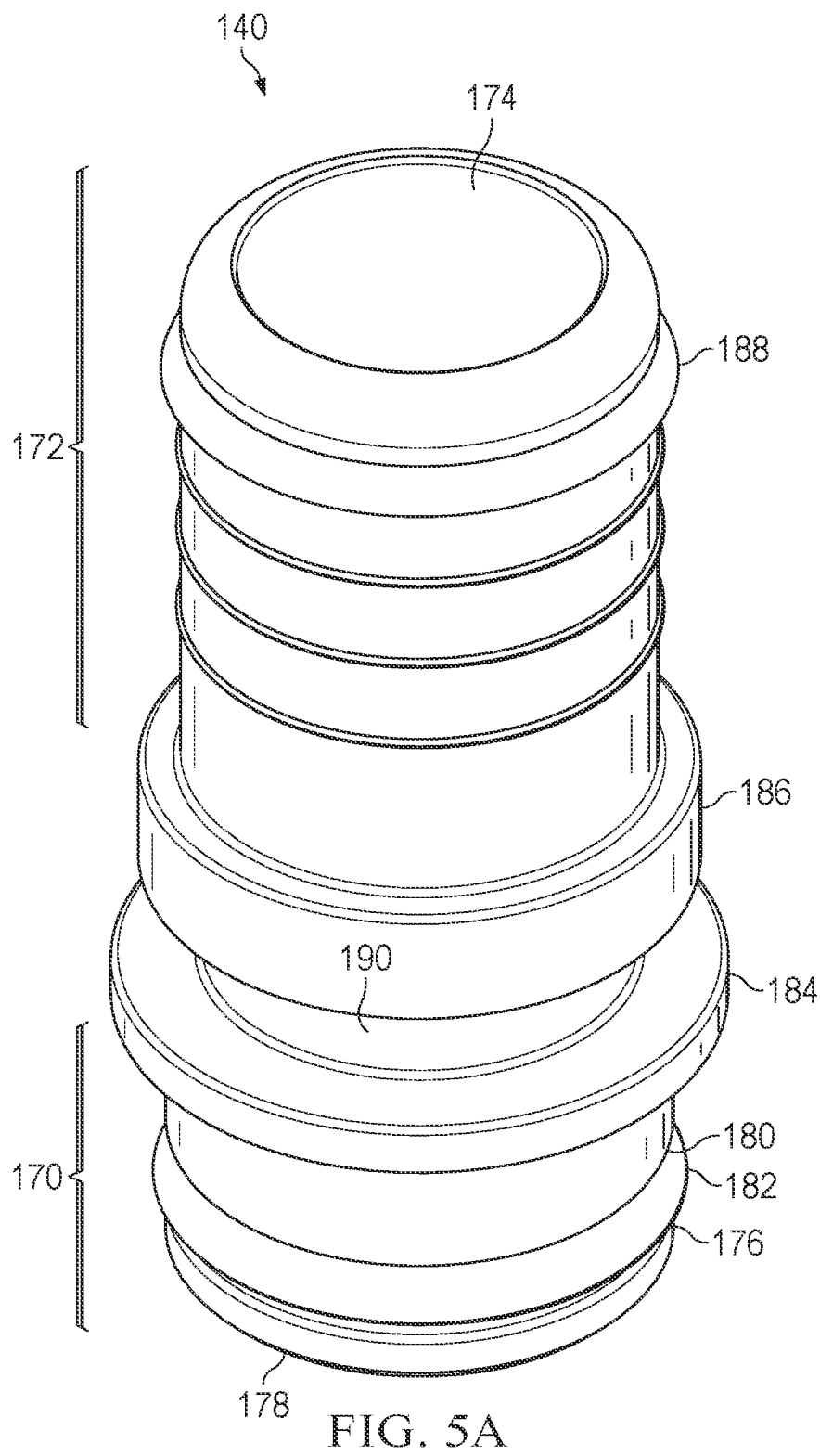
FIG. 5A is a perspective view of an embodiment of a straight modular connector.
Figure 5B:
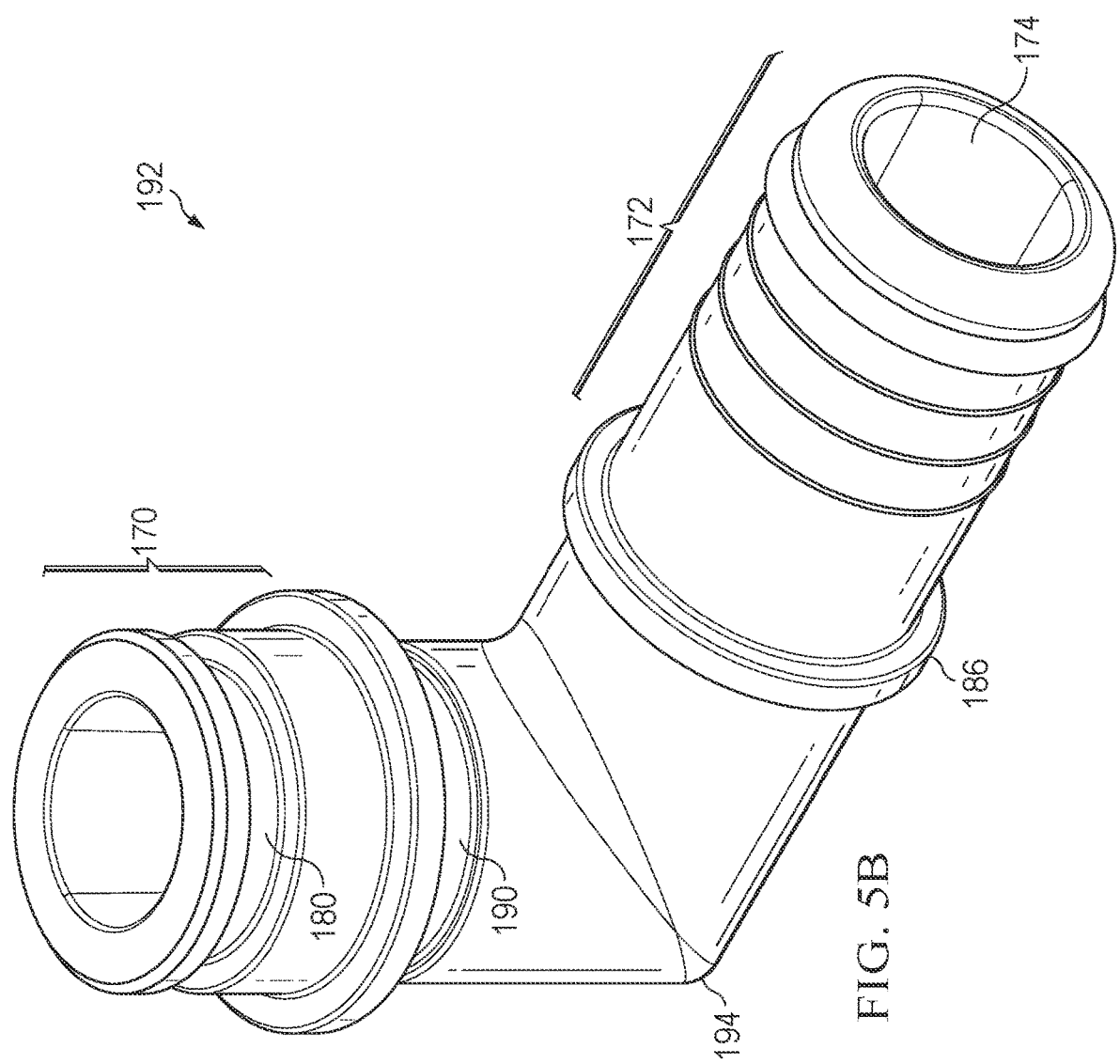
FIG. 5B is a perspective view of an embodiment of an angled modular connector.
Figure 5C:
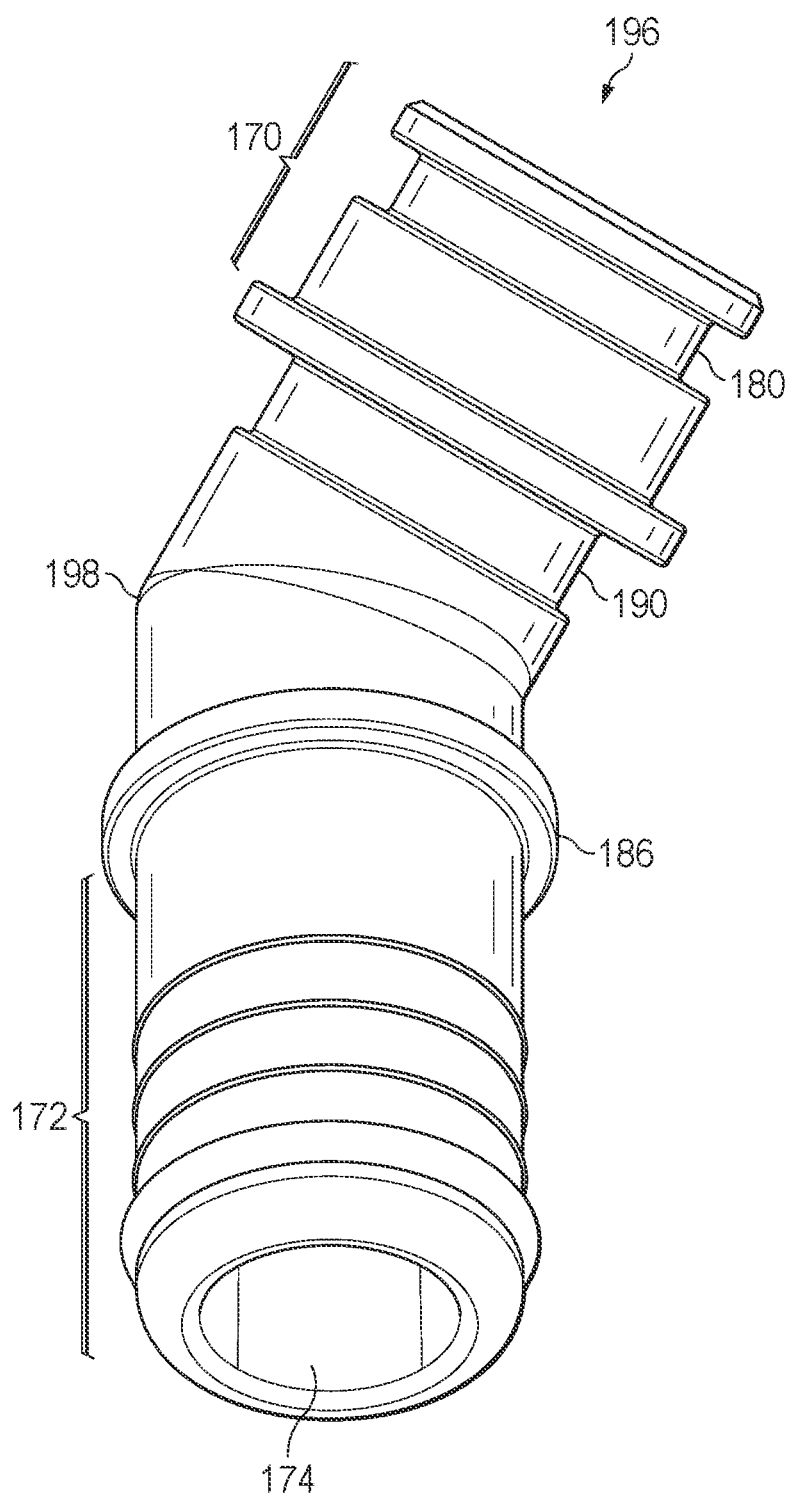
FIG. 5C is a perspective view of another embodiment of an angled modular connector.

FIGS. 5A-C show various port connectors. FIG. 5A shows the straight connector 140 illustrated in FIGS. 3A-B engaged with valve 100. Connector 140 has an engagement region 170 for connecting to a framed port and a connection region 172 for connecting to a tube or other external component. One having ordinary skill in the art will recognize that the term tube may include pipes, hoses and other fluid transfer components. The connection region is around the exterior opening 174 and the engagement region 170 is around the interior opening 178, which will be in a valve port or other port.

The engagement region 170 includes the end flange 176 and sealing channel 180 leading up to the engagement flange 184. A sealing O-ring 182 is in the sealing channel 180. The sealing O-ring 182 may be a rubber, neoprene, silicone, nylon or other material configured to create a fluid-tight seal between the engagement region 170 of the connector and a valve port, such as top port 102 in valve 100. Some embodiments may use an alternative to the sealing O-ring 182, such as a gasket, sealing sleeve or other seal.

The size and shape of the engagement region 170 is configured to correspond with a port, such as top port 102. The outer diameter of the end flange 176 is configured to be slightly less than the inner diameter of the top port 102 so that the engagement region fits into the top port 102. In addition, the distance from the end flange 176 to the engagement flange 184 may correspond to the depth of the top port 102. For each port 102, 104 and 106, the valve 100 may include an interior seat adjacent to the valve member 134 and an exterior seat closer to the first ring 124. When the connector 140 is installed, the end flange 176 may abut the interior seat while the engagement flange abuts the exterior seat. The additional abutments may add to the sealing arrangement between the connector 140 and the top port 102. This may be further increased if gaskets or sealing materials are added to the abutting edges.

Located between the engagement flange 184 and the connection region 172 are a locking channel 190 and raised ring 186 configured to be a backstop for any tube or other component that is placed on the connection region 172. The locking channel 190 aligns with the openings in the frame 120 when engaged with valve 100 in one of ports 102, 104 or 106. When locked with clip 150, the arms 152 and 154 wrap around the connector in the locking channel 190 with the back of the engagement flange 184 against the clip 150. During operation of the valve 100, any pressure on the connector 140 will push the engagement flange 184 outward against clip 150, which in-turn presses against second ring 126 preventing further movement of the connector 140 relative to the valve 100.

The connection region 172 of connector 140 is configured to fit within a tube or other structure. For example, a tube may fit over the connection region 172 from the raised ring 186. The tube may be crimped around the connection region 172 to attach the tube to the connector 140. When connected to the connection region 172, the angled flange 188 may also engage the inner wall of the tube to create a tighter fit and keep the fluid system sealed. When a tube is crimped on the connection region 172 behind the angled flange 188, the angled flange 188 acts as a further stop to prevent the tube from coming off the connector 140. Other embodiments may use alternative connection means between the connector 140 and the tube or other component, such as an adhesive, friction connection, snap-fit connection and other viable attachments that maintain a fluid seal and withstand pressure within the system.

FIG. 5B shows an alternative connector to the straight connector 140. The 90-degree connector 192 has the same basic elements as connector 140 along with a right-angle joint 194. Specifically, the 90 degree connector 192 has the engagement region 170, locking channel 190, raised ring 186 and connection region 172. The right-angle joint 194 is located between the locking channel 190 and the raised ring 186. In addition, this embodiment depicts the seal channel 180 without an O-ring or other sealing component in place.

FIG. 5C shows another alternative connector. The 45-degree connector 196 also has the same basic elements as connector 140 along with a 45-degree angle joint 198. Specifically, the 45-degree connector 196 has the engagement region 170, locking channel 190, raised ring 186 and connection region 172. The 45-degree angle joint 198 is located between the locking channel 190 and the raised ring 186.

While straight, 90 degree and 45 degree embodiments are shown, one having ordinary skill will recognize that any angle connection that fits the valve design and system may be used. In addition, curved connectors may be used instead of angled connectors.

As also illustrated by these examples, a variety of connectors may be designed using the same basic components for engagement with the port. For example, the modular system may include connectors that engage one port size while changing the size of the connection region 172 to accommodate different size tubing or system components. In addition, the connection region 172 may be designed to facilitate different connections. For example, a connector may have a threaded connection region to accommodate a corresponding threaded tube or component. As another example, the connection region 172 may be designed to facilitate a permanent connection to a tube having an integrated crimping component. The connector may have a rough or etched surface to better connect to a tube using an adhesive.

Figure 6:
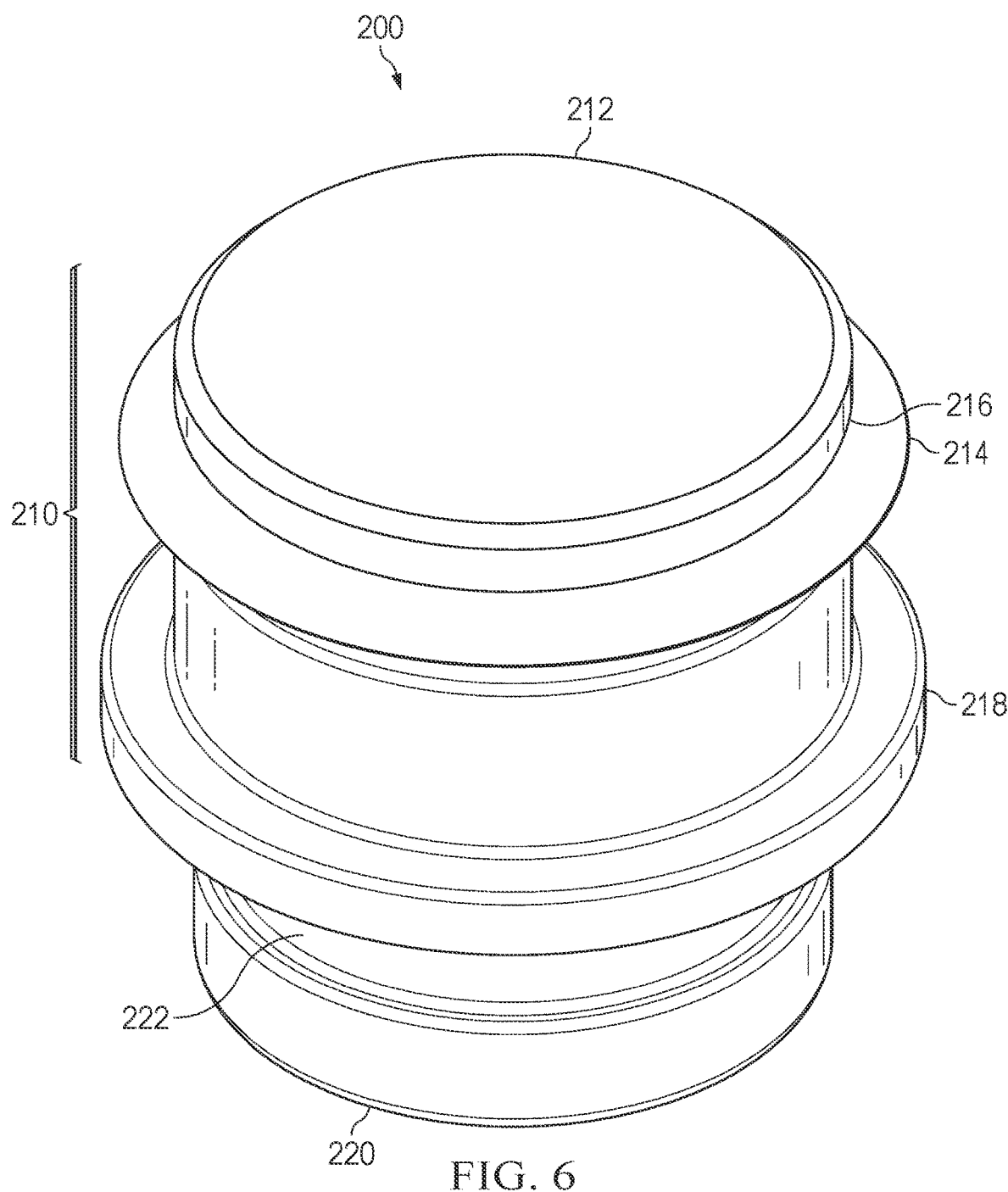
FIG. 6 is a perspective view of an embodiment of a modular plug component.

FIG. 6 shows a plug 200 that is designed to fit in the valve ports 102, 104 and 106. The plug 200 may be used to shut an unused port and allow the valve to operate as a flow control for a single pathway. In other words, as the valve member 134 rotates, the fluid flow can transition between fully open and fully shut—wherein the second opening in the valve member 134 is directed to the plug 200.

Like the connectors described above, the plug includes an engagement region 210 between the solid end cap 212 and the engagement flange 218. The engagement region 210 includes a seal channel 216 with an O-ring 214. On the opposite side of the engagement flange 218 is a locking channel 222 adjacent to end 220, which defines a raised ring at the back of the plug 200. During operation, the engagement region 210 is pressed into a port 102, 104 or 106 and locked in place using a locking clip 150 passing through the openings of the frame 120 and around the locking channel 222. The endcap 212 operates to plug the port adjacent to the valve member 134 and the sealing O-ring 214 further seals the plug 200 within the port 102, 104 or 106.

Figure 7:
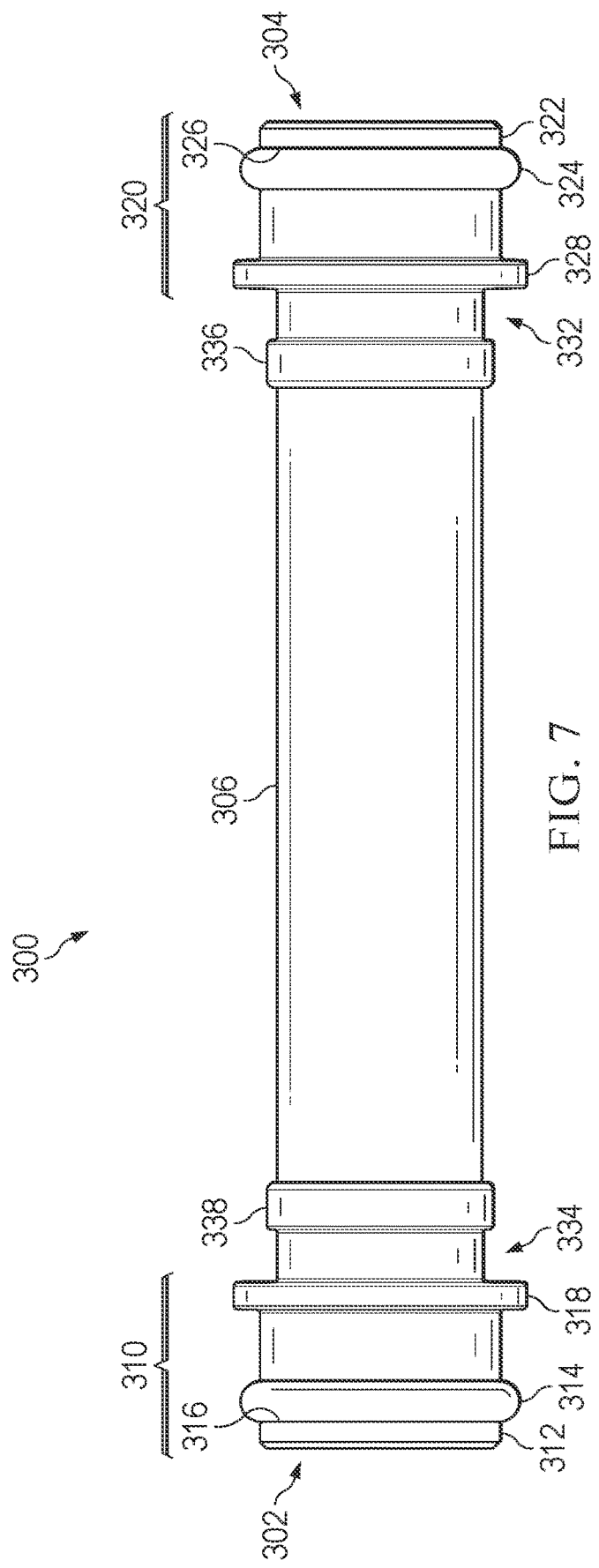
FIG. 7 is a side view of an embodiment of a dual-sided connector.

FIG. 7 discloses dual-sided connector 300 having a first opening 302 and a second opening 304 and an integrated tube section 306. The dual-sided connector 300 has a first engagement region 310 and a second engagement region 320, each of which is configured to attach to ports like those disclosed on valve 100. The first engagement region 310 extends from the first end flange 312 to the first engagement flange 318. It includes a first seal channel 316 having a first seal 314. Similarly, the second engagement region 320 extends from the second end flange 322 to the second engagement flange 328. It includes a second seal channel 326 having a second seal 324.

The first locking channel 334 is on the opposite side of the first engagement flange 318 from the first engagement region 310 and is adjacent to the first raised rim 338. The second locking channel 332 is similarly between the second engagement flange 328 and the second raised rim 336. The tube 306 connects the two engagement regions 310 and 320 between the two raised rims 336 and 338.

The tube 306 may be a rigid or semi-rigid component or could be a flexible tube. The tube 306 may be designed to support the valve 100 when connected to a fixed component, such as a water pump. Such embodiments may support a valve 100 without mounting posts 130.

Figure 8:
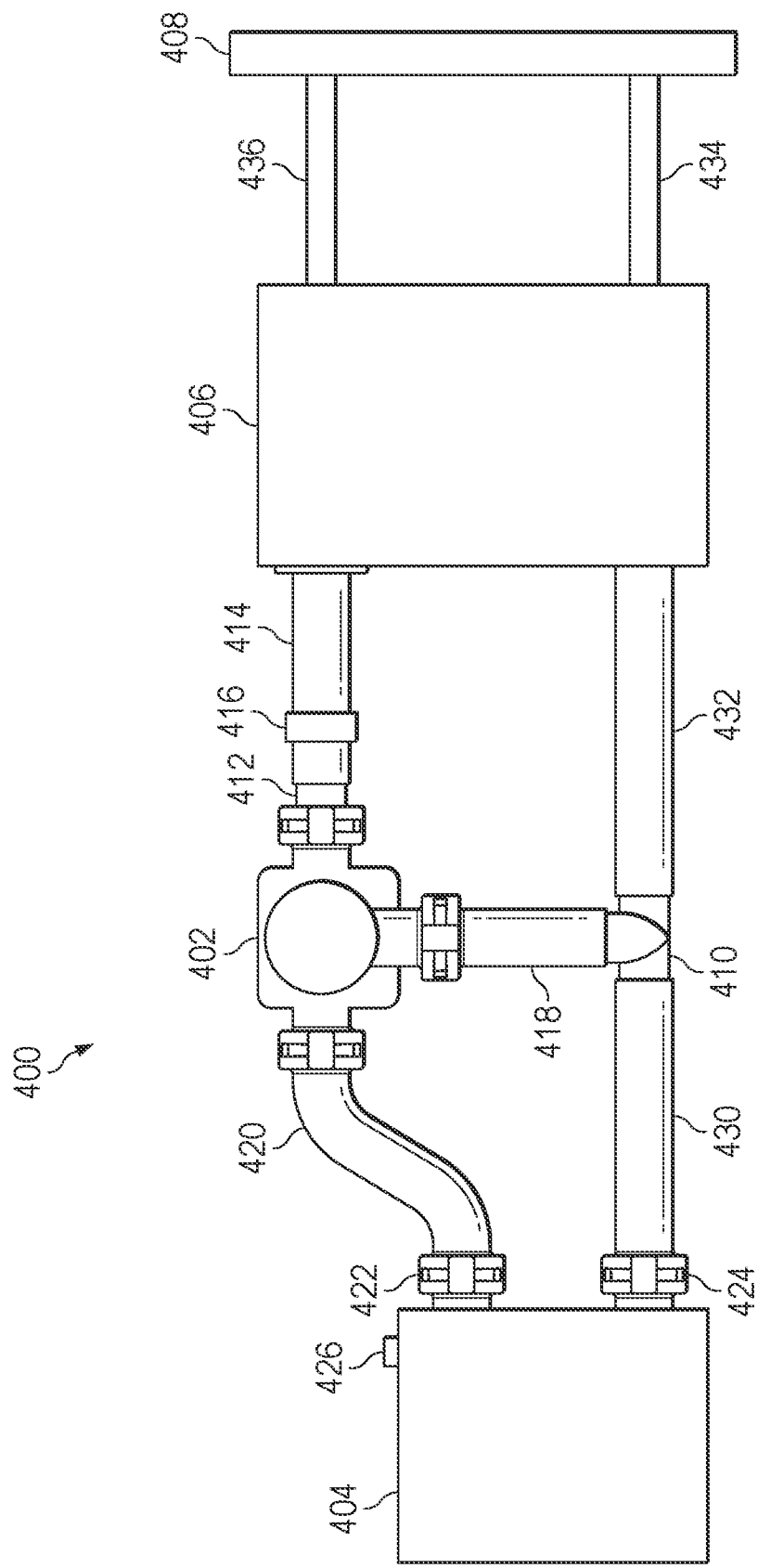
FIG. 8 is a diagram of an embodiment of a modular valve system implemented in an HVAC system.

FIG. 8 shows a simplified vehicle heating system 400. This heating system 400 includes a three-way valve 402 in the design of valve 100, a heat exchanger 404, an engine 406 and a radiator 408 connected by a series of tubes. In this system, a T-joint 410 is provided to form a bypass loop through the heating system 400 to the third port of valve 402.

In this embodiment, the first port of valve 402 is fluidly connected to the engine 406 by a straight connector 412 attached to tube 414 and further secured by the pipe clamp 416. As discussed above, straight connector 412 engages the first port of the valve 402 and is locked in place using a clip through the frame and around a channel of the straight connector 412. In this embodiment, the straight connector 412 may be attached to the tube 414 before the straight connector 412 is attached to the valve 402. This allows a person to have more working space during the installation process, and leaves the easier attachment to the valve 402 using the modular system disclosed as the last step. In contrast, the placement and crimping for a conventional port connection within the tight space is time consuming and can lead to inadvertent mistakes in installation, such as over-tightening (which may break or damage components) or under-tightening (which may not hold the tube in place during operation) the clamp or crimping component.

The third port of the valve 402 is attached to a connection rod 418. As with other connectors, the connection rod 418 includes the engagement region and locking channel components for attaching to the valve 402's third port. The opposite end of the connection rod may be any pipe fitting or a straight section on which a fitting may connect. For example, the connection rod 418 may have a threaded second end to allow it to be threaded on the T-joint 410. Alternatively, the connection rod 418 may have two engagement ends like the dual-sided connector 300 and the T-joint 410 may include corresponding framed ports like the valve 402.

The second port of the valve 402, which is opposite from the first port, is connected to a dual-sided connector 420. This dual-sided connector 420 has an offset configuration allowing the valve 402 to be offset from the port connector 422 of the heat exchanger 404. In some embodiments, the dual-sided connector 420 may be a rigid construction designed to support the valve 402 in a set position. A person skilled in the art will understand that the connectors 414, 418 and 420 may be rigid, flexible or any other design suitable for the system and purpose.

The heat exchanger 404 includes two framed ports 422 and 424 configured to accept and engage the engagement region of a connector as discussed with other embodiments. One skilled in the art will recognize that framed ports may also be used for creating fluid connections with other components, such as water pumps, condensers, Y-joints, T-joints and other joint designs, extensions, couplers, and other components.

As more components include the framed ports, the modular system becomes more advantageous. Tubes that are pre-attached to a connector with the engagement region to match the port make the installation process more efficient. For example, a kit may be provided for installation of an HVAC system in a first utility vehicle. The kit may include a series of HVAC components having framed ports along with a first set of hoses that are pre-crimped to port connectors for engaging the framed ports. A second kit for a second utility vehicle, having different installation requirements, may include a distinct second set of hoses that are pre-crimped to port connectors. For both installations, the user can use the engagement ports for quick assembly without adjusting the hose connection to the port connector, which can be difficult and lead to connection errors.

The heat exchanger 404 also includes a sensor 426 configured to communicate with the valve 402. The communication may be wired or wireless. The sensor 426 may be a temperature sensor, pressure sensor, flow rate sensor or any other type of sensor. During operation, the sensor 426 may communicate with the valve 402's control system to modify the fluid flow. For example, if the pressure is too high, the valve 402 may be controlled to reduce pressure or re-route the fluid flow to T-joint 410. As another example, the controller for valve 402 may receive a temperature selection from a user and the temperature from sensor 426. If the temperature from sensor 426 exceeds the threshold associated with the user selection, the valve 402 may be changed to bypass the heat exchanger 404 until the temperature is sufficiently reduced.

The T-joint 410 may include internal one-way valves in some embodiments to prevent backflow into the tube 430 or connector rod 418 during operation. In other embodiments, the shape or design of the T-joint 410 shown may be different to direct fluid flow patterns without internal valves. For example, the T-joint 410 may be replaced with a Y-joint that is directed downward to tube 432. In some embodiments, the T-joint 410 may be replaced with a second valve 402 that operates in coordination with the first valve 402 to control the fluid flow.

During operation, fluid flows through the heating system 400 in a loop. Beginning with the radiator 408, cooled fluid enters tube 436 to the engine 406. Within the engine 406, the fluid passes through the engine block absorbing heat produced by the engine 406. The heated fluid passes from the engine 406 through the tube 414 into the valve 402.

When the heat exchanger 404 is in use, the fluid passes straight through the valve 402 into the dual-sided connector 420 and then the heat exchanger 404. The heat exchanger 404 may be any known heat exchanger design. For heating purposes, the heat exchanger 404 may be a heater core with many fluid pathways that dissipate heat into an airflow. After heat is reduced through the heat exchanger 404, the fluid passes through tube 430, T-joint 410 and tube 432 back into the engine 406.

Alternatively, the valve 402 is in a configuration to bypass the heat exchanger 404. When bypassing the heat exchanger 404, the fluid passes from the valve 402 through the connector rod 418, T-joint 410 and tube 432 back into the engine 406.

During this portion of the loop, the heated fluid from the engine block or the fluid with reduced heat from the heat exchanger 404 passes through a different portion of the engine 406. For example, the fluid may be directed around the crankcase or oil pan. When it leaves this portion of the engine 406, it passes through tube 434 returning to the radiator 408, which reduces the temperature of the fluid.

The bypass system using valve 402 reduced pressure strain on the system that would otherwise occur if the valve was a single path shut off valve. By allowing fluid flow to continue, the fluid pressure does not build up at the single point and continues to flow through the system.

While the process has been described with a simplified heating system 400, the valve 402 may be implemented in a cooling system. For example, a three-way valve 402 may be used to bypass a heat exchanger, such as an evaporator, to allow colder fluid to be directed to an engine block or other components that need to be cooled. In addition, the valve may be implemented in other HVAC systems and fluid flow systems.

One additional benefit provided by the valve 402 is the ability to increase power efficiency in the system by directing fluid to components for heating and cooling a vehicle compartment only when needed and rerouting the fluid to other components that benefit from the temperature control while the fluid is not needed for the HVAC systems. For example, in a utility vehicle that is left running during use, the system may shift fluids to other systems while the vehicle is idling and back to the HVAC system when the vehicle is in gear. The modular valve system may operate in conjunction with other sensor and control systems, such as occupancy sensors, cabin sensors, engine sensors, etc., to maximize efficiency throughout the vehicle.

The invention being thus described and further described in the claims, it will be obvious that the same may be varied in many ways. Such variations are not to be regarded as a departure from the spirit and scope of the invention and all such modifications as would be obvious to one skilled in the art are intended to be included within the scope of the apparatus described.

The invention claimed is:
1. A modular valve system, comprising:
 a. a valve having a valve member within an internal chamber of a valve body, wherein the valve member has a control stem that passes through the valve body and is operable to rotate the valve member, and wherein the valve body comprises:
  i. a first port open to the internal chamber and having a first frame on an exterior, wherein the first frame has first frame openings defined by a first pair of rings separated by a first strut, and
  ii. a second port open to the internal chamber and having a second frame on an exterior, wherein the second frame has second frame openings defined by a second pair of rings separated by a second strut;
 b. a connector having an engagement region including a seal on an engaging end, wherein the engagement region fits into and seals against at least one of the first port and the second port, and wherein the connector has a locking channel and an engagement flange between the locking channel and the engagement region; and
 c. a locking clip having two arms that are connected by a bridge section on a first clip end and define a clip opening at a second clip end, wherein the locking clip further includes a pair of prongs within a bridge opening, wherein the locking clip is configured to pass through at least one of the first frame openings and the second frame openings, the locking clip further wraps around the locking channel of the connector, and wherein the pair of prongs pass around and then lock on an opposite side of at least one of the first strut and the second strut.

2. The modular valve system of claim 1, further comprising an actuator having a rotary shaft, which is operable to rotate based on control signals, wherein the control stem engages the rotary shaft and rotates when the rotary shaft rotates, thereby changing the position of the valve member within the valve body.

3. The modular valve system of claim 2, wherein the connector supports the valve and actuator without a frame during operation.

4. The modular valve system of claim 1 comprising a plurality of connectors, each including the engagement region and the locking channel, and each operable to engage at least one of the first port and the second port.

5. The modular valve system of claim 4, wherein the connector is a first port connector, and a second port connector is selected from the plurality of connectors.

6. The modular valve system of claim 1, wherein the connector has a second end opposite from the engagement region, wherein the second end is at least one of an angled connection port and a connection port having a second engagement region and a second locking channel.

7. The modular valve system of claim 1 having a third port operable to accommodate the connector and form a fluid seal with the connector.

* * * * *